(12) United States Patent
Kirkpatrick

(10) Patent No.: US 12,407,789 B2
(45) Date of Patent: Sep. 2, 2025

(54) AUTOMATED VIDEO CONFERENCE SYSTEM WITH MULTI-CAMERA SUPPORT

(71) Applicant: Crestron Electronics, Inc., Rockleigh, NJ (US)

(72) Inventor: Philip Kirkpatrick, Ridgewood, NJ (US)

(73) Assignee: Creston Electronics, Inc., Rockleigh, NJ (US)

( * ) Notice: Subject to any disclaimer, the term of this patent is extended or adjusted under 35 U.S.C. 154(b) by 227 days.

(21) Appl. No.: 18/211,317

(22) Filed: Jun. 19, 2023

(65) Prior Publication Data

US 2024/0422288 A1  Dec. 19, 2024

(51) Int. Cl.
*H04N 7/15* (2006.01)
*G06F 3/16* (2006.01)
*H04N 23/611* (2023.01)
*H04N 23/661* (2023.01)
*H04N 23/90* (2023.01)
*H04R 3/00* (2006.01)

(52) U.S. Cl.
CPC ............. *H04N 7/15* (2013.01); *G06F 3/162* (2013.01); *H04N 23/611* (2023.01); *H04N 23/661* (2023.01); *H04N 23/90* (2023.01); *H04R 3/005* (2013.01)

(58) Field of Classification Search
CPC ...... H04N 7/15; H04N 23/611; H04N 23/661; H04N 23/90; H04N 7/147; G06F 3/162; H04R 3/005
See application file for complete search history.

(56) References Cited

U.S. PATENT DOCUMENTS

| | | | | |
|---|---|---|---|---|
| 10,819,953 B1* | 10/2020 | Lovitt | .................... | G06F 16/487 |
| 2008/0267282 A1* | 10/2008 | Kalipatnapu | ....... | H04L 12/1822 |
| | | | | 348/E7.084 |
| 2016/0373693 A1* | 12/2016 | Segal | .................... | H04N 21/47 |

\* cited by examiner

*Primary Examiner* — Yosef K Laekemariam

(57) ABSTRACT

A method for selecting video and audio in a video conference system for a conference room using at least two or more smartphone cameras each having at least one camera adapted to generate and transmit a video stream with its respective video-associated metadata (VAM) to at least one conference room transceiver. Additional embodiments include generating audio data by at least two or more microphones located within the conference room that are not communicatively coupled to any of the smartphones.

23 Claims, 8 Drawing Sheets

AUTOMATED VIDEO CONFERENCE SYSTEM WITH MULTI-CAMERA SUPPORT

BACKGROUND OF THE INVENTION

Technical Field

The embodiments described herein relate to a video conference system, and more particularly to the coordinated deployment of smartphones to capture video within a video conference area.

Background

Video conference has become increasingly popular in recent years, as businesses, educational institutions, and individuals look to connect and collaborate with others in remote locations. However, existing solutions have several limitations that can reduce the effectiveness of video conferences.

One problem with existing solutions is the difficulty of ensuring that all participants are framed during the conference. Traditional video conference systems may use a single camera, which can make it challenging to capture all participants in a large conference room. Additionally, the use of a single stationary camera may result in participants being blocked from view, which can detract from the quality of the conference.

Another problem with existing solutions is the complexity of the setup process. Many video conference systems require significant configuration, which can be time-consuming and challenging for users without technical expertise. This can result in delays and frustration, which can detract from the overall quality of the conference.

Moreover, existing solutions also may not be able to adapt to changing environmental factors, such as changes in area lighting, scene, or acoustics, which can impact the quality of the conference.

It is therefore desirable to provide a video conference system that can optimize camera framing and tracking to ensure that all participants are visible and audible. In view of these limitations, there is a need for a video conference system and method that can provide more intelligent camera collaboration, dynamic camera positioning, and automated camera switching. Such a system and method would enhance the video conference experience for users, improve communication, and facilitate more efficient remote collaboration.

SUMMARY OF THE INVENTION

In one general aspect, a method is provided for selecting video and audio in a conference system that includes operating at least two or more smartphone to generate video streams and transmitting the generated respective video streams. Embodiments also include generating video-associated metadata (VAM) by the respective smartphones regarding the transmitted video streams and transmitting the generated video-associated metadata to at least one conference room transceiver. Embodiments may also include receiving the generated video-associated metadata from each of the at least two smartphone cameras by at least one room processor transceiver. Embodiments may also include generating audio data by at least two or more microphones located within the conference room, the microphones not communicatively coupled to any of the smartphones.

Embodiments may also include transmitting the generated audio data to the at least one conference room transceiver. Embodiments may also include receiving the generated audio data from each of the at least two microphones by the at least one room processor transceiver. Embodiments may also include generating an audio composite by a room processor communicatively coupled to the at least one room processor transceiver by combining all the received audio data.

Embodiments may also include analyzing the received video-associated metadata by the room processor. Embodiments may also include selecting one of the video streams to be a selected video stream based on the analyzed video-associated metadata. Embodiments may also include transmitting the selected video stream and the audio composite to a remote endpoint.

In one embodiment, the method according to may include generating audio metadata for each of the plurality of received audio data. Embodiments may also include analyzing the received audio metadata from each of the plurality of smartphones to determine ambient noise levels in the conference room. Embodiments may also include selecting an appropriate noise reduction process based on the determined ambient noise level.

Embodiments may also include applying the selected noise reduction process to the received audio data prior to transmitting the audio data to the remote endpoint. Embodiments may also include selecting an appropriate echo cancellation process based on the determined ambient noise level. Embodiments may also include applying the selected acoustic echo cancellation process to the received audio data prior to transmitting the audio data to the remote endpoint.

In one embodiment, the method according to may include selecting one of the video streams based on one or more of the generated audio metadata and analyzed video-associated metadata. Embodiments may also include generating one or more camera control commands based on the received and analyzed video-associated metadata. Embodiments may also include analyzing the received video-associated metadata to detect motion. Embodiments may also include transmitting the one or more camera control commands to the smartphone that corresponds to the selected video stream. Embodiments may also include analyzing the received video-associated metadata to identify participants based on their facial features. In one embodiment, the video-associated metadata may include verification identification information of one or more participants based on facial features from biometric data from an infra-red LIDAR camera sensor located on the smartphone.

Embodiments may also include a plurality of the at least one or more of the plurality of microphones form an array microphone with electronically steerable pickup lobes as computed by an audio processing software application.

Embodiments of the present disclosure may also include a video conference method for a conference room including a plurality of smartphones each including at least one camera adapted to generate a video stream. Embodiments may also include at least one transceiver adapted to wirelessly transmit the video stream and video-associated metadata, and wirelessly receive one or more camera control commands.

Embodiments may also include at least one mobile processor adapted to communicatively couple to the camera and the transceiver. Embodiments may also include a first memory operatively connected to the at least one mobile processor. In one embodiment, the memory stores a first set of computer-executable instructions that, when executed by the at least one mobile processor, causes the at least one mobile processor to execute a first method that may include.

Embodiments may also include operating the camera, transmitting the generated video stream via the at least one transceiver, generating a video-associated metadata (VAM) regarding the transmitted video stream, and transmitting the generated video-associated metadata via the at least one transceiver. Embodiments may also include a plurality of microphones, each of the plurality of microphones aimed at a specific region within the conference room, each microphone adapted to receive acoustic audio signals, convert the received acoustic audio signals to electrical audio data signals, and transmit the electrical audio data signals as audio data.

Embodiments may also include at least one room processor transceiver adapted to receive and transmit data and command signals. Embodiments may also include at least one room processor communicatively coupled to the at least one room processor transceiver. Embodiments may also include a second memory operatively connected to the at least one room processor.

In one embodiment, the second memory stores a second set of computer-executable instructions that, when executed by the at least one room processor, causes the at least one room processor to execute a second method that may include receiving the plurality of audio data from each of the plurality of microphones by the at least one room processor transceiver.

Embodiments may also include generating an audio composite by combining all the received audio data. Embodiments may also include receiving video-associated metadata from each smartphone by the at least one room processor transceiver. Embodiments may also include analyzing the received video-associated metadata. Embodiments may also include selecting one of the video streams to be a selected video stream based on the analyzed video-associated metadata. Embodiments may also include transmitting the selected video stream and the audio composite to a remote endpoint.

In one embodiment, the video conference method for a conference room according to may include generating a plurality of sets of audio metadata respectively for each of the plurality of received audio data. In one embodiment, the step of selecting one of the video streams may include selecting one of the video streams based on one or more of the generated audio metadata in addition to the analyzed video-associated metadata.

In one embodiment, the step of selecting one of the video streams may include selecting one of the video streams based on one or more of the generated audio metadata in place of the analyzed video-associated metadata. In one embodiment, the second method may include analyzing the generated audio metadata from each of the plurality of smartphones to determine ambient noise levels in the conference room. Embodiments may also include analyzing the determined ambient noise levels. Embodiments may also include selecting an appropriate noise reduction process based on the determined ambient noise level.

Embodiments may also include applying the selected noise reduction process to the received audio data prior to transmitting the audio data to the remote end. Embodiments may also include selecting an appropriate echo cancellation process based on the determined ambient noise level. Embodiments may also include applying the selected acoustic echo cancellation process to the received audio data prior to transmitting the audio data to the remote end.

In one embodiment, the step of selecting one of the video streams to be a selected video stream based on the analyzed video-associated metadata includes generating one or more camera control commands based on the received and analyzed video-associated metadata and transmitting the one or more camera control commands to the smartphone that corresponds to the selected video stream.

In one embodiment, the step of analyzing the received video-associated metadata may include analyzing the received video-associated metadata using one or more machine learning algorithms to identify participants based on their facial features. In one embodiment, the step of analyzing the received video-associated metadata may include analyzing the received video-associated metadata using one or more machine learning algorithms to detect motion.

In one embodiment, the video-associated metadata includes verification identification information of one or more participants based on facial features from biometric data from the infra-red LIDAR camera. In one embodiment, the second memory stores a third set of computer-executable instructions that, when executed by the at least one processor, causes the at least one processor to execute a third method that may include executing a unified communication software application for hosting a unified communication with the remote endpoint.

Embodiments may also include at least one or more of the plurality of microphones may include an array microphone adapted to generate electronically steerable pickup lobes computed by an audio processing software application. In one embodiment, the step of generating video-associated metadata regarding the transmitted video stream may include generating the video-associated metadata from a hardware sensor other than the camera. In one embodiment, the hardware sensor may be located on the smartphone. In one embodiment, the hardware sensor may include an infra-red LIDAR camera.

Embodiments of the present disclosure may also include a non-transitory computer-readable medium storing a set of instructions for selecting video and audio in a video conference system for a conference room, the set of instructions including one or more instructions that, when executed by one or more processors of a device, cause the device to operate at least two or more smartphone cameras in the conference room to generate respective video streams.

Embodiments may also include transmit the generated respective video streams. Embodiments may also include generate video-associated metadata (VAM) by the respective smartphones regarding the transmitted video streams. Embodiments may also include transmit the generated video-associated metadata to at least one conference room transceiver.

Embodiments may also include receive the generated video-associated metadata from each of the at least two smartphone cameras by at least one room processor transceiver. Embodiments may also include generate audio data by at least two or more microphones located within the conference room, the microphones not communicatively coupled to any of the smartphones.

Embodiments may also include transmit the generated audio data to the at least one conference room transceiver. Embodiments may also include receive the generated audio data from each of the at least two microphones by the at least one room processor transceiver. Embodiments may also include generate an audio composite by a room processor communicatively coupled to the at least one room processor transceiver by combining all the received audio data.

Embodiments may also include analyze the received video-associated metadata by the room processor. Embodiments may also include select one of the video streams to be a selected video stream based on the analyzed video-associated metadata. Embodiments may also include transmit the selected video stream and the audio composite to a remote endpoint.

In one embodiment, the one or more instructions further cause the device to generate audio metadata for each of the plurality of received audio data. Embodiments may also include analyze the received audio metadata from each of the plurality of smartphones to determine ambient noise levels in the conference room. Embodiments may also include select an appropriate noise reduction process based on the determined ambient noise level.

Embodiments may also include apply the selected noise reduction process to the received audio data prior to transmitting the audio data to the remote endpoint. Embodiments may also include select an appropriate echo cancellation process based on the determined ambient noise level. Embodiments may also include apply the selected acoustic echo cancellation process to the received audio data prior to transmitting the audio data to the remote endpoint.

In one embodiment, the one or more instructions further cause the device to select one of the video streams based on one or more of the generated audio metadata and analyzed video-associated metadata. Embodiments may also include generate one or more camera control commands based on the received and analyzed video-associated metadata. Embodiments may also include transmit the one or more camera control commands to the smartphone that corresponds to the selected video stream. Embodiments may also include analyze the received video-associated metadata to identify participants based on their facial features. Embodiments may also include analyze the received video-associated metadata to detect motion.

Embodiments may also include a plurality of the at least one or more of the plurality of microphones form an array microphone with electronically steerable pickup lobes as computed by an audio processing software application. In one embodiment, the video-associated metadata may include verification identification information of one or more participants based on facial features from biometric data from an infra-red LIDAR camera sensor located on the smartphone.

BRIEF DESCRIPTION OF DRAWINGS

The above and other objects and features of the embodiments will become apparent and more readily appreciated from the following description of the embodiments with reference to the following figures. Several aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
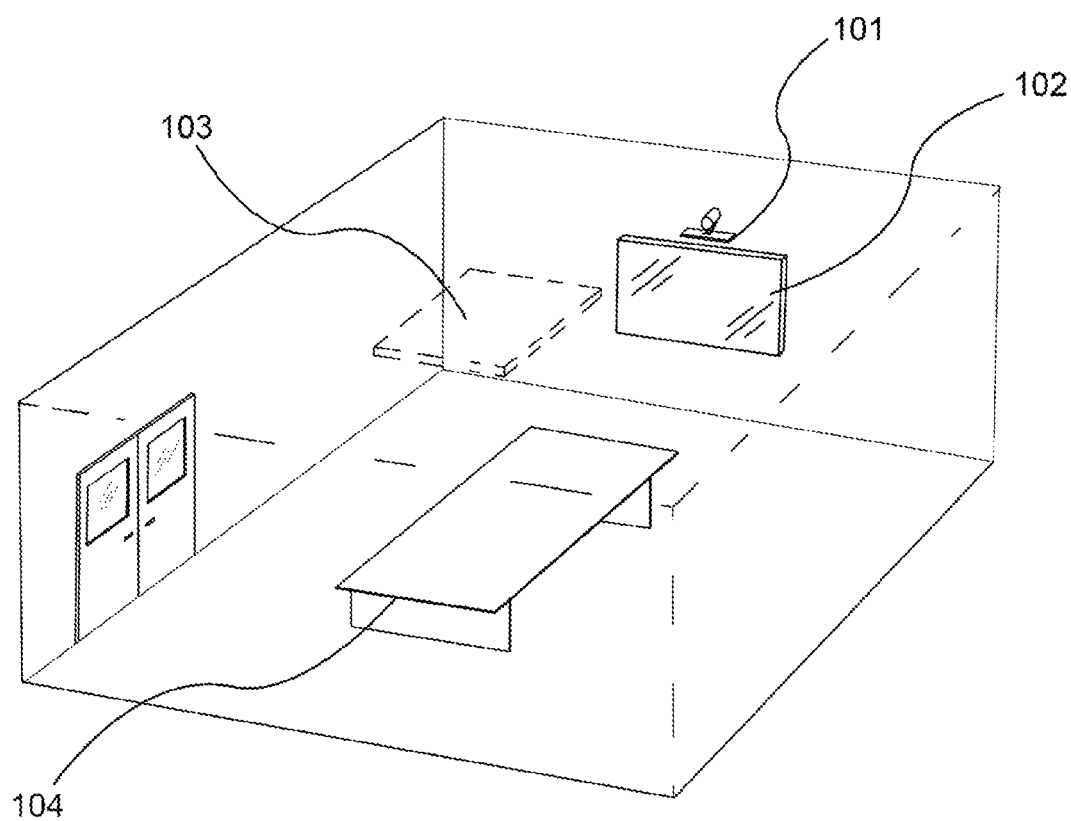

FIG. 1 illustrates a conventional conference room.

Figure 2:
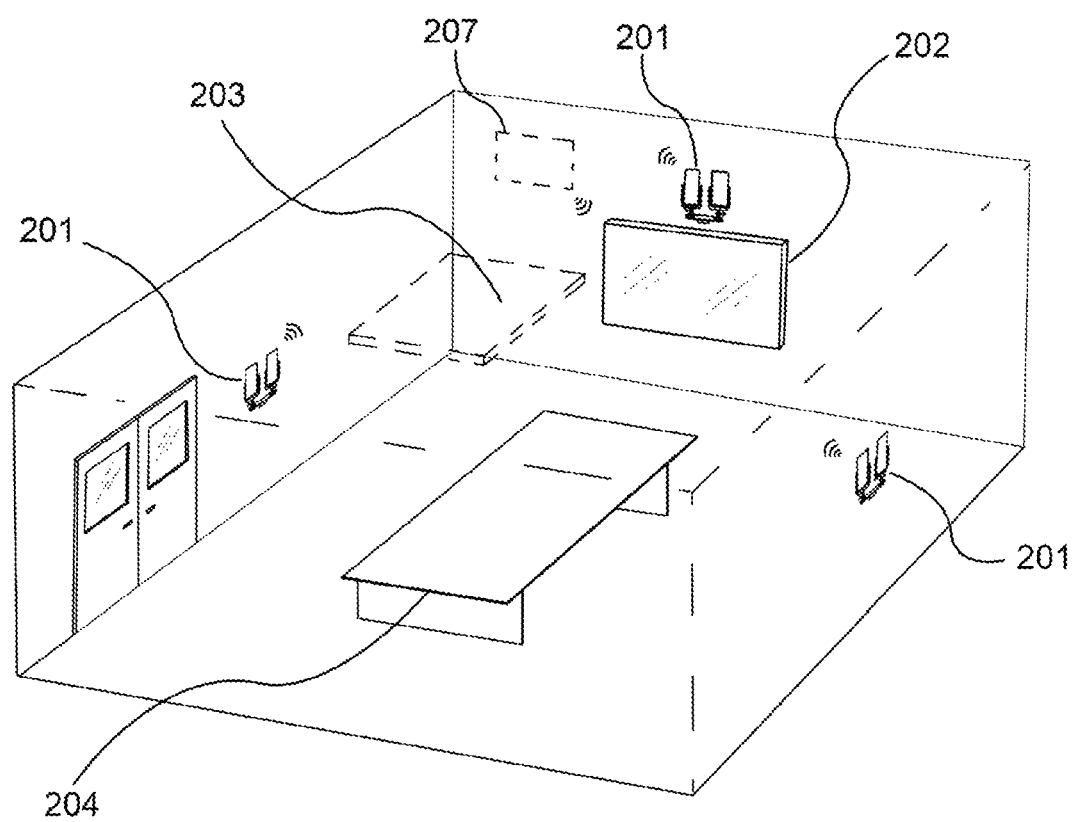

FIG. 2 illustrates a conference room having a plurality of wall mounted smartphones, according to some embodiments of the present disclosure.

Figure 3:
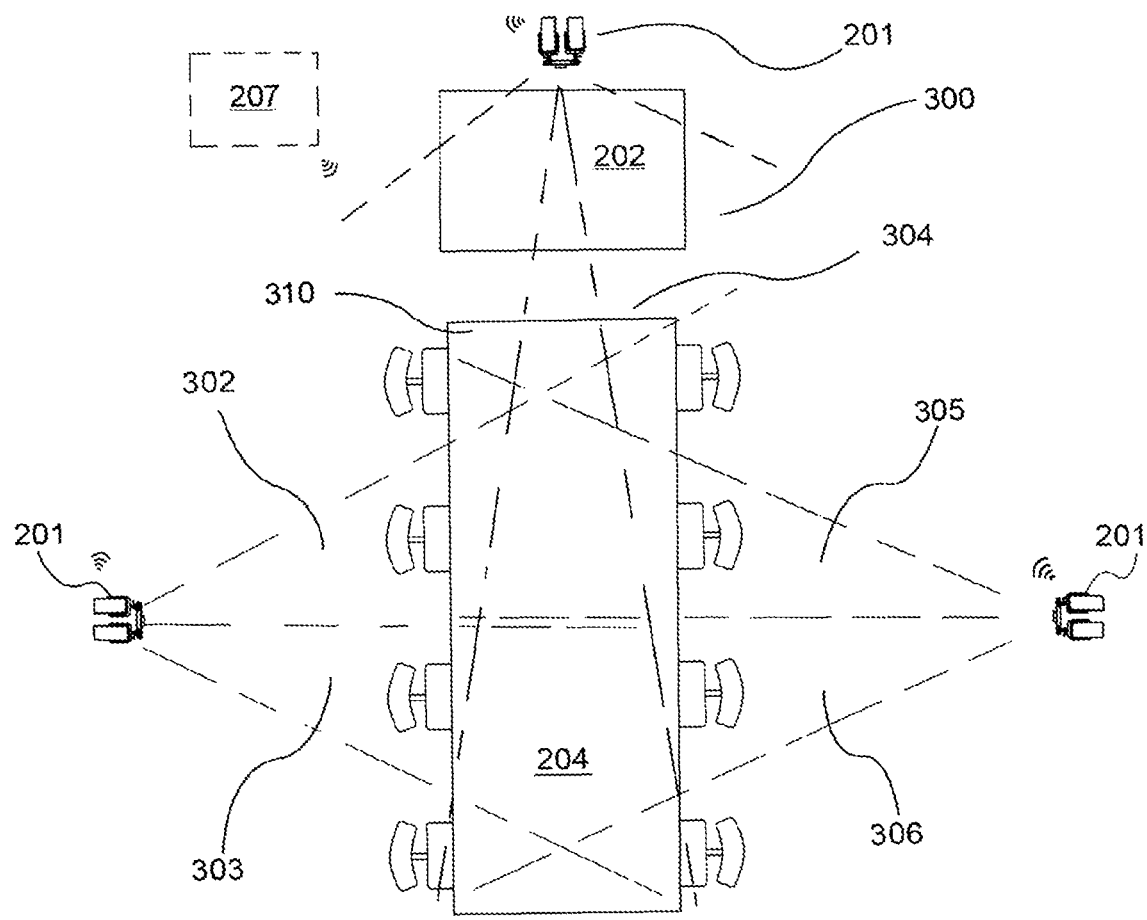

FIG. 3 shows participant coverage, according to an embodiment of the present disclosure.

Figure 4:
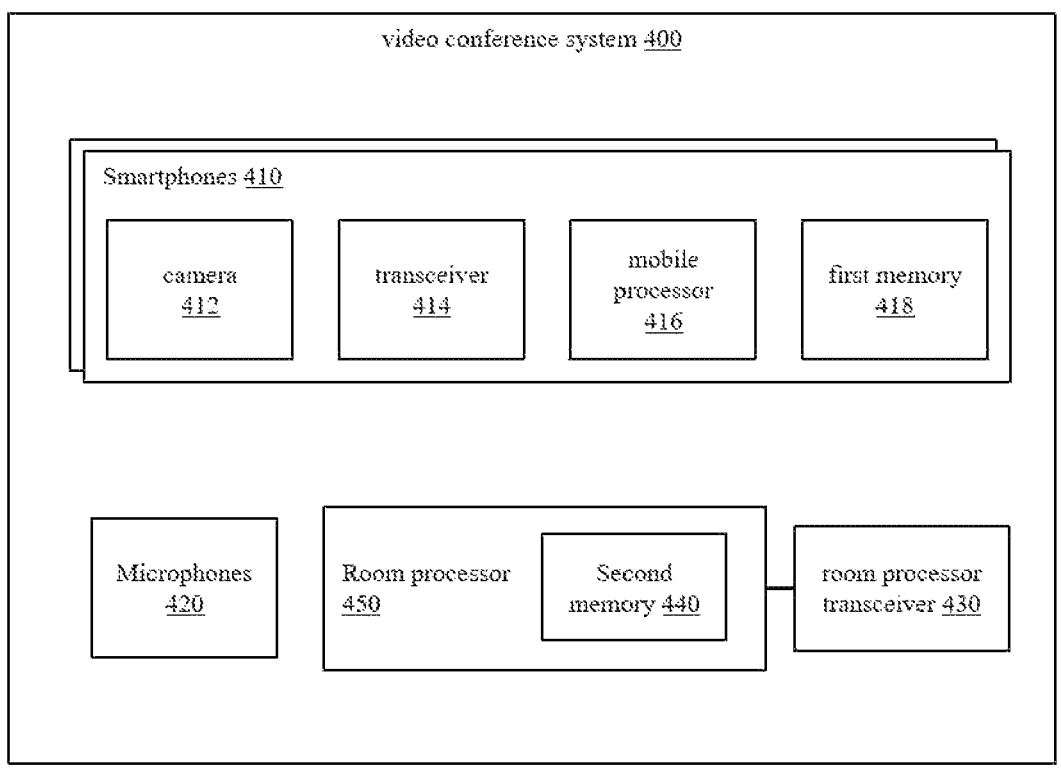

FIG. 4 is a block diagram illustrating a video conference system, according to some embodiments of the present disclosure.

Figure 5A:
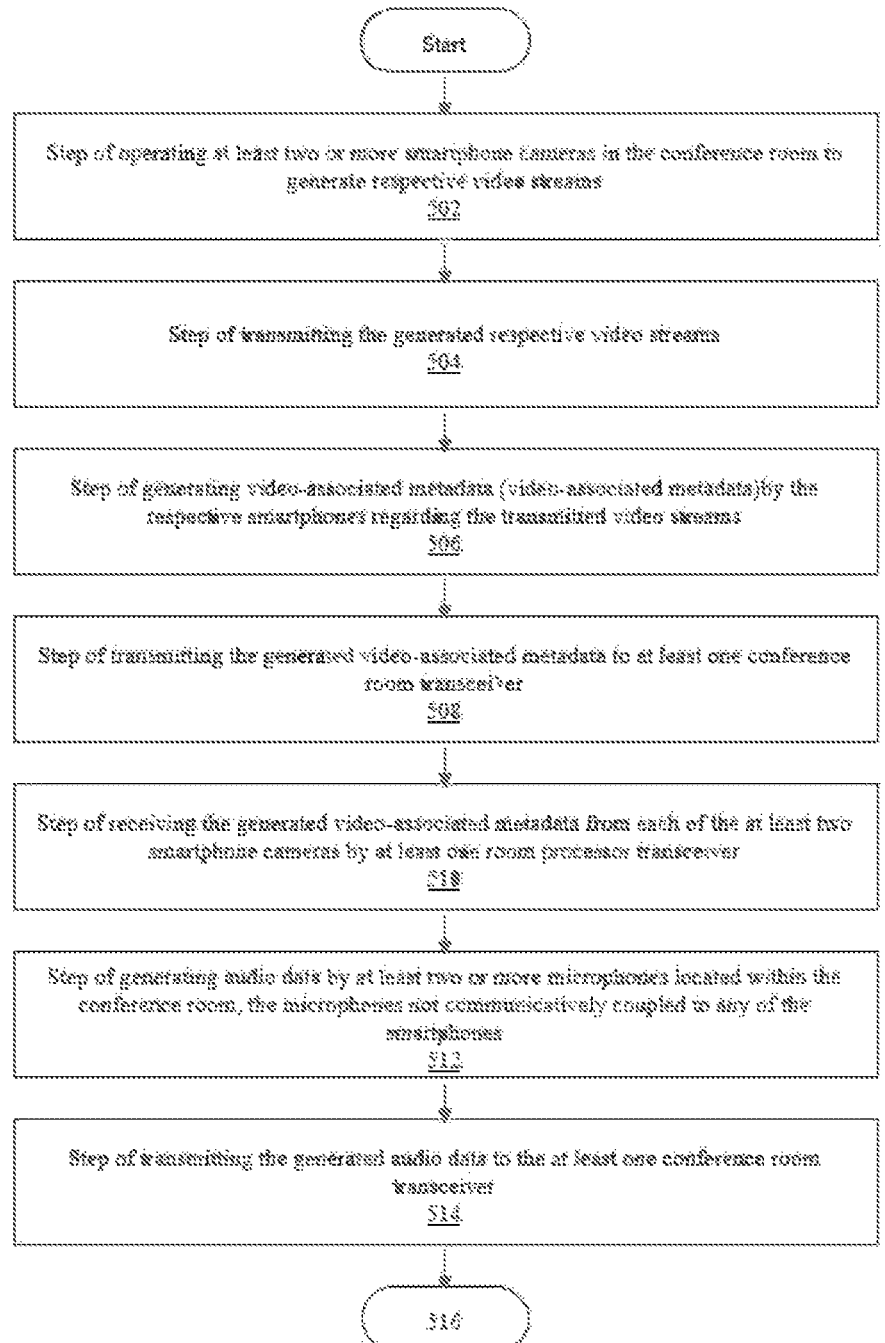

FIG. 5A is a flowchart illustrating a method for selecting video and audio in a video conference system for a conference room, according to some embodiments of the present disclosure.

Figure 5B:
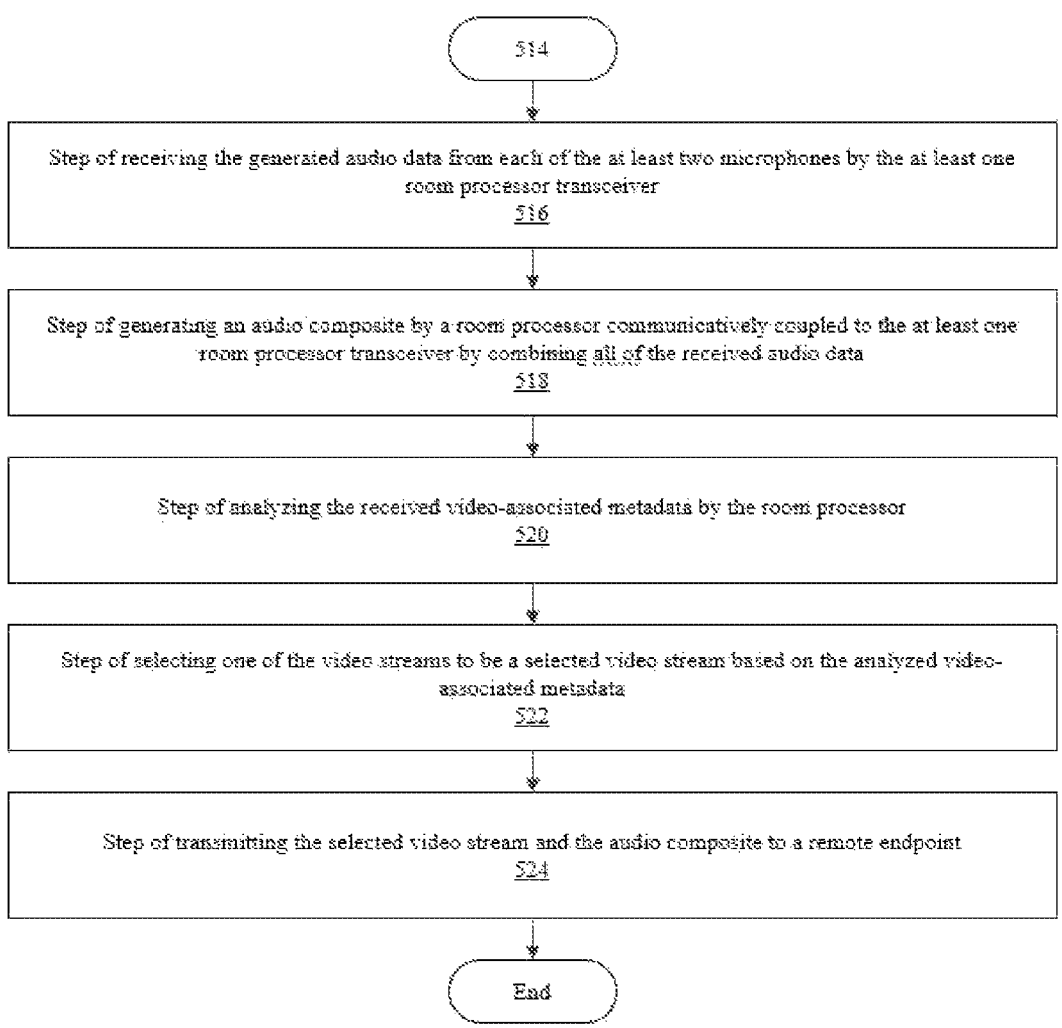

FIG. 5B is a flowchart extending from FIG. 5A and further illustrating the method for selecting video and audio in a video conference system for a conference room, according to some embodiments of the present disclosure.

Figure 6A:
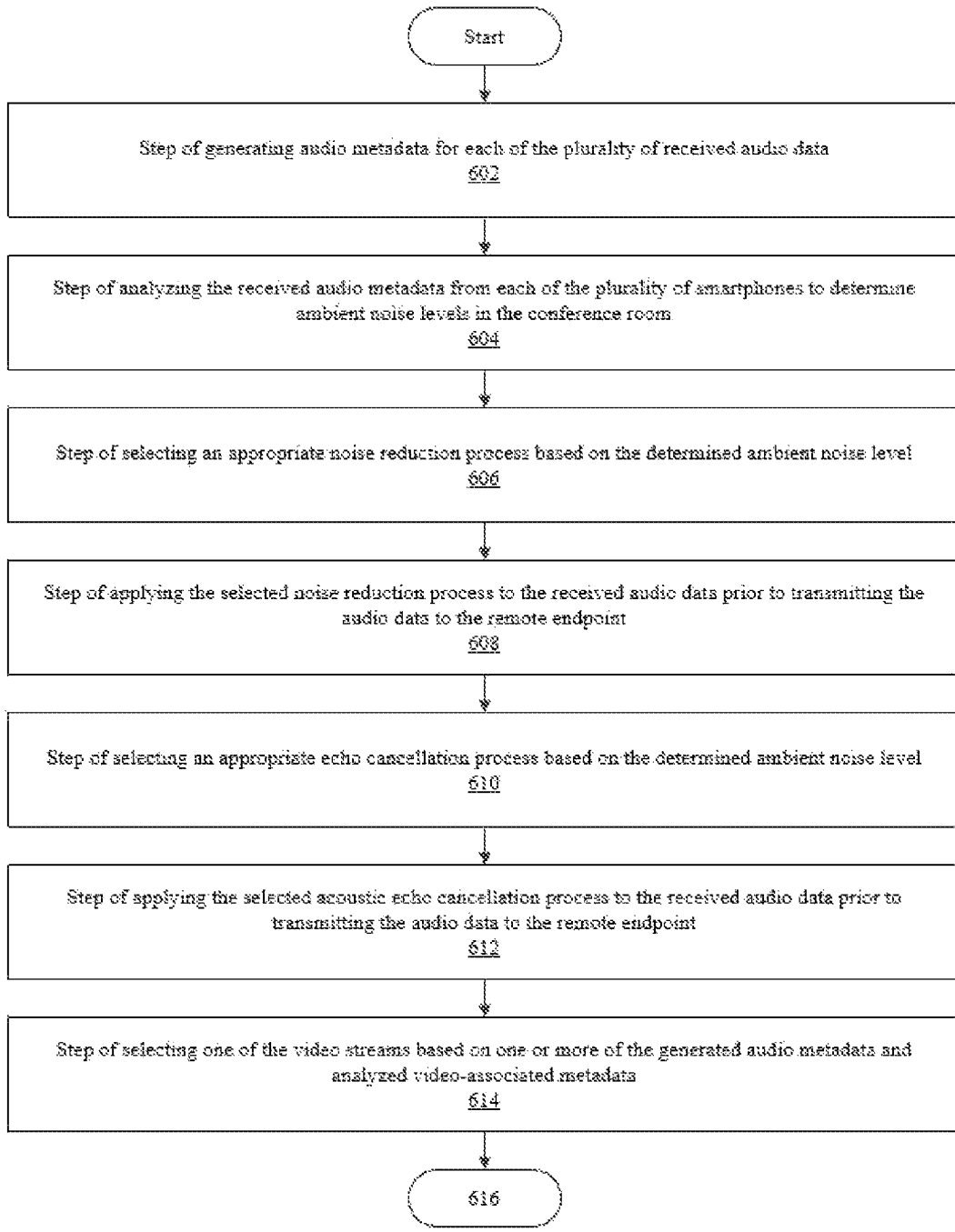

FIG. 6A is a flowchart further illustrating the method for selecting video and audio in a video conference system for a conference room from FIG. 5A, according to some embodiments of the present disclosure.

Figure 6B:
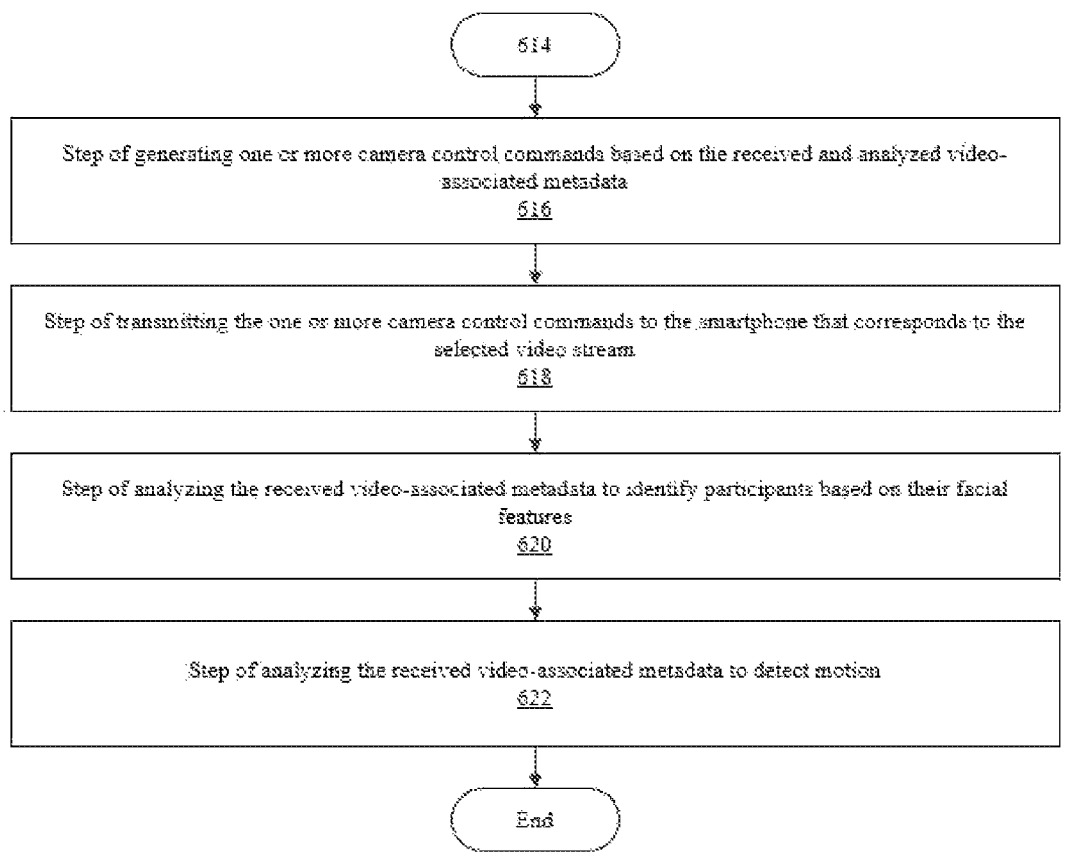

FIG. 6B is a flowchart extending from FIG. 6A and further illustrating the method for selecting video and audio in a video conference system for a conference room, according to some embodiments of the present disclosure.

DETAILED DESCRIPTION OF THE INVENTION

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the feature, structures, or characteristics may be combined in any suitable manner in one or more embodiments.

The description below of the aspects of the embodiments, is both non-exclusive and non-limiting. The description below of the aspects of the embodiments is non-exclusive in that additional terms can or have been used, and it is non-limiting in that other meanings as defined in the description below in view of the context of the aspects of the embodiments can be inferred therefrom. Thus, the following is meant as a non-limiting beginning guide to understanding the terms in view of the aspects of the embodiments.

A conventional conference room configuration is shown in FIG. 1. In this configuration, the conference room may have a table 104 for meeting participants to gather around, a display 102 for showing remote meeting participants to be seen, a ceiling microphone array 103 for localizing and capturing audio from the meeting participants seated at table 104, and a PTZ camera 101 for capturing and streaming video of the.

In FIG. 2. plurality of smartphones 201 are secured to the walls of the conference using wall mounts. Beamforming microphone 203 is installed in the ceiling of the conference room and is capable of beamforming to capture audio from the direction of a currently active speaking participant. Among other data, room processor 207 receives video related data from smartphones 201 and audio related data from microphone 203. Room processor 207 selects and transmits a selected video stream from one of smartphones 201 and an audio composite to a remote endpoint that is currently participating in a unified communication with said room processor 207. Accordingly, room processor 207 hosts the unified communication software program with which one or more remote endpoints subscribe to.

Video captured by the smartphones 201 is transmitted to the room processor for processing prior to transmission to remote participants. Video-associated metadata is also provided by the smartphones 201 and the beamforming microphone 203, which includes information which allows room processor 207 to create and issue commands to smartphones 201. As further described below, examples of Metadata are not limited to, for example, room dimensions, lighting, acoustics, and other environmental factors.

Smartphones 201 have local onboard hardware-based vision processing capabilities which may include machine learning vision algorithms that can be used to generate video-associated metadata which then can used by room processor 207 to improve, for example, camera framing, tracking, and video stream selection.

To utilize the metadata values, smartphones 201 utilize onboard processing to collect and generate metadata values in real-time. For example, the smartphones can use computer vision algorithms to analyze the video streams and find the participants based on their facial features. The smartphones can also use machine learning algorithms to analyze the audio levels and frequency to identify the speaker. Additionally, the smartphones can use GPS, accelerometer, and gyroscope sensors to determine the position and movement of the participants and generate meta data further containing this information.

The metadata values from the wall-mounted smartphones can also be combined with other sources of data to further improve the performance of the system. For example, the system can use additional sensors, such as temperature and humidity sensors, to detect and resolve environmental factors that can affect the video conference quality. Additionally, the system can use user preferences and profiles, to customize the video conference experiences and include preferences and profiles as additional metadata.

The system and method can be implemented in various hardware configurations, depending on the specific use case and requirements. For example, the wall-mounted smartphones can be connected to a local network and the room processor can be a separate device, such as a desktop computer or a server. Alternatively, the wall-mounted smartphones can be connected to the room processor via a wireless connection such as Wi-Fi or Bluetooth.

The system and method can also utilize various security measures to protect the privacy and security of the video conference participants. For example, the system can encrypt the video streams and metadata values to prevent unauthorized access or interception. Additionally, the system can require authentication and authorization for accessing the video conference and controlling the cameras.

The system and method can also be extended to work with other unified communications software and platforms, providing interoperability and compatibility across different systems and environments. For example, the system can be used with other popular video conference software and platforms, such as Cisco Webex, Google Meet, and the like.

In one embodiment, the video-associated metadata may include face landmark data. In one embodiment, face landmark detection is a smartphone's onboard hardware accelerated computer vision task that involves detecting specific landmarks or points on a human face such as the ears, eyes, nose, mouth, and chin in order to accurately recognize these landmarks and use them to generate face landmark data for video conference applications including face recognition, facial expression analysis, and head pose estimation metadata.

In one embodiment, the camera-like command may be a saliency command based on a saliency detection in video captured by smartphones using a saliency-based method.

In one embodiment, saliency detection is a smartphone's onboard hardware accelerated task that involves detecting less important pixels that are less likely to be noticed by a viewer and tagging them differently than the more important pixels (those more likely to be noticed.) In an embodiment, less important pixels are tagged in a way that increases compression gain (lower image quality.) Because less important pixels are less likely to be noticed, any reduction in image quality for the less important pixels due to the higher compression technique is less likely to be noticed while viewing the video stream. A saliency map is determined for some or all video frames. The saliency map indicates the relative importance of each pixel in the corresponding frame based on its perceptual significance.

In another embodiment, the hardware sensor may be an infra-red LIDAR camera. In one embodiment, the video-associated metadata may include verification identification information of one or more participants based on facial features from biometric data from the infra-red LIDAR camera.

FIG. 3 shows, smartphone 201 camera view coverage 300, 302, 303, 304, 305, 306, and 310 according to an embodiment. These views are the coverage that room processor 207 may select from when selecting one of the respective video streams of smartphone 201 to be the selected video stream based, for example, on analyzing video-associated metadata.

Room processor 207 can automatically switch to camera 201 that provides the best view (300, 302,303, 304, 305, 306, and 310) of the participant who is speaking. In one embodiment, this is accomplished with generated video-associated metadata (VAM) by the smartphones 201 regarding their transmitted video streams.

The room processor can also make decisions about which camera to use based on a range of additional factors such as lighting, background, and participant movement, for example. The room processor can also learn and improve its decision making over time.

Room processor 207 can use audio analysis to enhance audio of a participant that is speaking and then automatically switch to the camera that provides the best view of that participant. This can be accomplished by analyzing audio data signals to determine ambient noise levels in the conference room, analyzing the determined ambient noise levels, selecting an appropriate noise reduction process based on the determined ambient noise level, applying the selected noise reduction process to the received audio data prior to transmitting the audio data to the remote end, selecting an appropriate echo cancellation process based on the determined ambient noise level, and applying the selected acoustic echo cancellation process to the received audio data.

In one embodiment audio metadata is generated for audio data received from two or more microphones located within the conference room where the said microphones not communicatively coupled to any of the smartphones. In one example, the metadata values can include the volume, frequency response, and noise level of the audio stream. The room processor can use this metadata with noise reduction algorithms to improve the clarity of the speech of the participants by reducing the background noise.

In an embodiment, room processor 207 can detect the background of the conference room and automatically switch to the camera that provides the best view of the background. This can be useful in situations where the background is relevant to the video conference, such as when a presentation is being given.

Room processor 207 can also analyze received video-associated metadata to understand motion in the conference room and automatically switch to the relevant camera 201 that provides the best view of the moving object or participant. The video-associated metadata may include motion sensor data that can be used to detect the movements of the participants, for example, metadata values may include the acceleration, orientation, and position of the participants relative to their surrounding objects. Room processor 207 can use this metadata to effect virtual camera panning to keep participants remain in the frame.

In one embodiment, room processor 207 can analyze received video-associated metadata generated using the depth sensors located on smartphone 201 to create a 3D model of the conference room and then use that information to automatically switch to the camera that provides the best view of the participant who is speaking using depth information.

In one embodiment, room processor 207 can use facial recognition technology to recognize the participants in the conference room and then automatically switch to the camera that provides the best view of the participant who is speaking. This could be accomplished using metadata using face landmark data, described above.

Metadata values from the smartphones' face detection algorithm can be used to identify the participants in the conference room. The metadata values can include the location, size, and orientation of the faces in the video stream. The room processor 207 can use this metadata to determine the number of participants, their positions and orientation.

The metadata values from the smartphones' gesture recognition algorithms can be used to detect and track the gestures of the participants. In these embodiments metadata values would include the position, duration, and movement of the hands and/or fingers. Room processor 207 can use this information to provide real-time hand tracking and gesture recognition, allowing the participants to control the selected video stream using hand gestures.

The metadata values from the smartphones' light sensor can be used to control the lighting in the conference room. The metadata values can include the ambient light level, color temperature, and hue. Room processor 207 can use this metadata to adjust the lighting settings, ensuring that the participants are well-lit and visible in the video stream.

The metadata values from the smartphones' object detection algorithm can be used to detect and track objects in the conference room. The metadata values can include the position, size, and orientation of the objects. Room processor 207 can use this metadata to adjust the camera settings, such as the focus and exposure, ensuring that the objects are visible and clear.

The metadata values generated from the smartphones' rear and/or front facing microphones can be independently used to convey room acoustics using impulse and response measurements. For example, the metadata values can include the duration, amplitude, and frequency of a response of an impulse or sweep audio pattern. The room processor 207 can use this metadata to remove background noise, enhance speech, or cancel echo or reverberation.

Room processor 207 can use motion detection technology to detect when a participant is moving or gesturing and then automatically switch to the camera that provides the best view of that participant. This can be useful in situations where participants are using gestures to convey information.

The metadata values from the smartphones' accelerometer and gyroscope can be used to track the motion of the participants. The metadata values can include the acceleration, velocity, and orientation of the smartphones. The room processor 207 can use this metadata to adjust the camera position and zoom level, ensuring that the participants are always in the frame and visible to the other participants.

Room processor 207 can provide multi-camera views, allowing endpoint users to see multiple camera angles simultaneously. This can be accomplished using split-screen or picture-in-picture views. The metadata from the smartphones may further include geometric positions provide multiple camera views of a participant within a conference room. In one embodiment, the metadata values can include the position, orientation, and zoom levels. Room processor 207 can use this metadata to display the camera views side-by-side or switch between them based on the user's preferences.

The audio data from an array comprised of a plurality of microphones each uniquely aimed at a specific region within the conference room can be used to provide multi-channel audio. The provide multi-channel audio can be used to determine position, orientation, and frequency response at a specific region within the conference room. Room processor 207 can use this data to separate audio streams of the participants into different channels, providing a more immersive and spatial audio experience. Room processor 207 can use a speaker recognition algorithm to identify the speakers in an audio stream using voiceprint, pitch, and frequency response of the speakers. Room processor 207 can use this information to identify the speakers and adjust the audio settings accordingly, such as the volume, equalization, and audio beam steering.

Room processor 207 can provide predefined camera angles for the conference room, allowing the user to select the best angle for the situation. Room processor 207 can then automatically switch to the selected camera angle when the user speaks or gestures.

The metadata values from the smartphones' audio stream can be used to track the location of the speaker. The metadata values can include the direction, amplitude, and frequency response of the audio stream. Room processor 207 can use this metadata to adjust the camera position and zoom level, ensuring that the active speaker is always in the frame.

Room processor 207 can use multiple cameras to provide a wide shot of the conference room and then automatically zoom in on the speaker as they are speaking. This can be accomplished using advanced algorithms that detect the location and movement of the participants and adjust the camera settings accordingly.

FIG. 4 is a block diagram that describes a video conference system 400, according to some embodiments of the present disclosure. In one embodiment, the video conference system 400 may include a plurality of smartphones 410, at least one room processor transceiver 430 adapted to receive and transmit data and command signals, at least one room processor 450 communicatively coupled to the at least one room processor transceiver 430, and a second memory 440 operatively connected to the at least one room processor 450. The video conference system 400 may also include a plurality of microphones 420, each of the plurality of microphones 420 aimed at a specific region within the conference room, each microphone adapted to receive acoustic audio signals, convert the received acoustic audio signals to electrical audio data signals, and transmit the electrical audio data signals as audio data.

The plurality of smartphones 410 include at least one camera 412 adapted to generate a video stream, at least one mobile processor 416 adapted to communicatively couple to the camera 412 and the transceiver 414, and a first memory 418 operatively connected to the at least one mobile processor 416. The plurality of smartphones 410 may also include at least one transceiver 414 adapted to wirelessly transmit the video stream and video-associated metadata, and wirelessly receive one or more camera control commands.

In one embodiment, the memory stores a first set of computer-executable instructions that, when executed by the at least one mobile processor 416, causes the at least one mobile processor 416 to execute a first method that. Operating the camera 412, transmitting the generated video stream via the at least one transceiver 414, generating a video-associated metadata (VAM) regarding the transmitted video stream, and transmitting the generated video-associated metadata via the at least one transceiver 414.

In one embodiment, the second memory stores a second set of computer-executable instructions that, when executed by the at least one room processor 450, causes the at least one room processor 450 to execute a second method that. Receiving the plurality of audio data from each of the plurality of microphones 420 by the at least one room processor transceiver 430. In embodiment, further generating an audio composite by combining all of the received audio data and further receiving video-associated metadata from each smartphone by the at least one room processor transceiver 430, and further analyzing the received video-associated metadata. This further includes selecting one of the video streams to be a selected video stream based on the analyzed video-associated metadata and transmitting the selected video stream and the audio composite to a remote endpoint.

In one embodiment, this further includes generating a plurality of sets of audio metadata respectively for each of the plurality of received audio data. The step of selecting one of the video streams includes selecting one of the video streams based on one or more of the generated audio metadata in addition to the analyzed video-associated metadata. In one embodiment, the step of selecting one of the video streams comprises selecting one of the video streams based on one or more of the generated audio metadata in place of the analyzed video-associated metadata.

In one embodiment, a second method includes analyzing the generated audio metadata from each of the plurality of smartphones 410 to determine ambient noise levels in the conference room and selecting an appropriate noise reduction process based on the determined ambient noise level, applying the selected noise reduction process to the received audio data prior to transmitting the audio data to the remote end, selecting an appropriate echo cancellation process based on the determined ambient noise level, and applying the selected acoustic echo cancellation process to the received audio data prior to transmitting the audio data to the remote end.

In an embodiment, the step of selecting one of the video streams to be a selected video stream is based on the analyzed video-associated metadata, generating one or more camera control commands based on the received and analyzed video-associated metadata before transmitting one or more camera control commands to the smartphone that corresponds to the selected video stream. In one embodiment, the step of analyzing the received video-associated metadata uses one or more machine learning algorithms to identify participants based on their facial features. In another embodiment, the step of analyzing the received video-associated metadata includes analyzing the received video-associated metadata using one or more machine learning algorithms to detect motion. The video-associated metadata may also comprise verification identification information of one or more participants based on their facial features from biometric data from the infra-red LIDAR camera.

In one embodiment, the second memory stores a third set of computer-executable instructions that, when executed by the at least one processor, causes the at least one processor to execute a third method including executing a unified communication software application for hosting a unified communication with the remote endpoint. In one embodiment, the step of generating video-associated metadata regarding the transmitted video stream includes generating the video-associated metadata from a hardware sensor other than the camera 412. The hardware sensor may be located on the smartphone. In one embodiment, the hardware sensor is an infra-red LIDAR camera.

FIGS. 5A to 5B are flowcharts that describe a method for selecting video and audio in a video conference system for a conference room, according to some embodiments of the present disclosure. At step 502, the method may include operating at least two or more smartphone cameras in the conference room to generate respective video streams. At step 504, the method may include transmitting the generated respective video streams. At step 506, the method may include generating video-associated metadata (VAM) by the respective smartphones regarding the transmitted video streams.

At step 508, the method may include transmitting the generated video-associated metadata to at least one conference room transceiver. At step 510, the method may include receiving the generated video-associated metadata from each of the at least two smartphone cameras by at least one room processor transceiver. At step 512, the method may include generating audio data by at least two or more microphones located within the conference room, the microphones not communicatively coupled to any of the smartphones.

At step 514, the method may include transmitting the generated audio data to the at least one conference room transceiver. At step 516, the method may include receiving the generated audio data from each of the at least two microphones by the at least one room processor transceiver. At step 518, the method may include generating an audio composite by a room processor communicatively coupled to the at least one room processor transceiver by combining all of the received audio data. At step 520, the method may include analyzing the received video-associated metadata by the room processor. At step 522, the method may include selecting one of the video streams to be a selected video stream based on the analyzed video-associated metadata. At step 524, the method may include transmitting the selected video stream and the audio composite to a remote endpoint.

FIGS. 6A to 6B are flowcharts that further describe the method for selecting video and audio in a video conference system for a conference room, according to some embodiments of the present disclosure. At step 602, the method may include generating audio metadata for each of the plurality of received audio data. At step 604, the method may include analyzing the received audio metadata from each of the plurality of smartphones to determine ambient noise levels in the conference room. At step 606, the method may include selecting an appropriate noise reduction process based on the determined ambient noise level.

In some embodiments, at 608, the method may include applying the selected noise reduction process to the received audio data prior to transmitting the audio data to the remote endpoint. At step 610, the method may include selecting an appropriate echo cancellation process based on the determined ambient noise level. At step 612, the method may include applying the selected acoustic echo cancellation process to the received audio data prior to transmitting the audio data to the remote endpoint.

In some embodiments, at step 614, the method may include selecting one of the video streams based on one or more of the generated audio metadata and analyzed video-associated metadata. At step 616, the method may include generating one or more camera control commands based on the received and analyzed video-associated metadata. At step 618, the method may include transmitting the one or more camera control commands to the smartphone that corresponds to the selected video stream. At step 620, the method may include analyzing the received video-associated metadata to identify participants based on their facial features. At step 622, the method may include analyzing the received video-associated metadata to detect motion.

In some embodiments, a plurality of the at least one or more of the plurality of microphones may form an array microphone with electronically steerable pickup lobes as computed by an audio processing software application. In some embodiments, the video-associated metadata may further comprise verification identification information of one or more participants based on facial features from biometric data from a infra-red LIDAR camera sensor located on the smartphone.

Although FIGS. 5A-6B show example steps of processes, in some implementations, they may include additional steps, fewer steps, different steps, or differently arranged steps than those depicted in FIG. 5A-6B.

It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

Specific embodiments of the present application are described above. Other embodiments are within the scope of the appended claims. In some cases, the actions or steps recited in the claims can be performed in an order different from that in the embodiments and can still achieve desired results. In addition, the processes depicted in the figures do not necessarily have to be in a particular or sequential order, to achieve desired results. In some implementations, mobile electronic devices can be used as well as smartphones, among other mobile electronics devices (MEDs), such as laptops, tablets, personal electronic devices (PEDs), and the like are also possible or may be advantageous.

An embodiment of the present application further provides a computer-readable storage medium storing computer instructions, where when the computer instructions are executed by a processor, the steps of the methods described above are implemented.

The computer instructions include computer program code, which may be in a source code form, an object code form, an executable file form, some intermediate forms, etc. The computer-readable medium may include, any entity or apparatus that can carry the computer program code, such as a recording medium, a USB flash drive, a removable hard disk, a solid state drive, magnetic disk, an optical disc, a computer memory, a read-only memory (ROM), a random access memory (RAM), and a software distribution medium. It should be noted that the content included the term "computer-readable medium" does not include an electrical carrier signal or telecommunications signal.

It should be noted that, for ease of description, the foregoing method embodiments are described as a series of action combinations. However, those skilled in the art should understand that the present application is not limited to the described action order, because according to the present application, some steps may be performed in another order or simultaneously. Moreover, those skilled in the art should also understand that the embodiments described in the specification all are preferred embodiments, and the involved actions and modules are not necessarily required by the present application.

In the foregoing embodiments, the embodiments are described with different emphases, and for a part which is not detailed in an embodiment, reference can be made to the related description of the other embodiments.

The preferred embodiments of the present application disclosed above are merely provided to help illustrate the present application. Optional embodiments are not intended to exhaust all details, nor do they limit the invention to only the described specific implementations. Apparently, many modifications and variations may be made in light of the content of the present application. In the present application, these embodiments are selected and specifically described to provide a better explanation of the principles and actual applications of the present application, so that those skilled in the art can well understand and utilize the present application. The present application should be defined only by the claims, and the full scope and equivalents thereof.

The invention claimed is:

1. A method for selecting video and audio in a video conference system for a conference room comprising:
   operating at least two or more smartphone cameras in the conference room to generate respective video streams;
   transmitting the generated respective video streams;
   generating video-associated metadata (VAM) by the respective smartphones regarding the transmitted video streams;
   transmitting the generated video-associated metadata to at least one conference room transceiver;

receiving the generated video-associated metadata from each of the at least two smartphone cameras by at least one room processor transceiver;
generating audio data by at least two or more microphones located within the conference room, the microphones not communicatively coupled to any of the smartphones;
transmitting the generated audio data to the at least one conference room transceiver;
receiving the generated audio data from each of the at least two microphones by the at least one room processor transceiver;
generating an audio composite by a room processor communicatively coupled to the at least one room processor transceiver by combining all of the received audio data;
analyzing the received video-associated metadata by the room processor; and
selecting one of the video streams to be a selected video stream based on the analyzed video-associated metadata; and
transmitting the selected video stream and the audio composite to a remote endpoint.

2. The method according to claim 1, further comprising:
generating audio metadata for each of the plurality of received audio data;
analyzing the received audio metadata from each of the plurality of smartphones to determine ambient noise levels in the conference room;
selecting an appropriate noise reduction process based on the determined ambient noise level;
applying the selected noise reduction process to the received audio data prior to transmitting the audio data to the remote endpoint;
selecting an appropriate echo cancellation process based on the determined ambient noise level; and
applying the selected acoustic echo cancellation process to the received audio data prior to transmitting the audio data to the remote endpoint.

3. The method according to claim 2, further comprising:
selecting one of the video streams based on one or more of the generated audio metadata and analyzed video-associated metadata;
generating one or more camera control commands based on the received and analyzed video-associated metadata;
transmitting the one or more camera control commands to the smartphone that corresponds to the selected video stream;
analyzing the received video-associated metadata to identify participants based on their facial features; and
analyzing the received video-associated metadata to detect motion.

4. The method according to claim 3, wherein a plurality of said at least one or more of the plurality of microphones form an array microphone with electronically steerable pickup lobes as computed by an audio processing software application.

5. The method according to claim 4, wherein the video-associated metadata further comprises verification identification information of one or more participants based on facial features from biometric data from a infra-red LIDAR camera sensor located on the smartphone.

6. A video conference system for a conference room comprising:
a plurality of smartphones each comprising:
at least one camera adapted to generate a video stream,
at least one transceiver adapted to wirelessly transmit the video stream and video-associated metadata, and wirelessly receive one or more camera control commands, and
at least one mobile processor adapted to communicatively couple to the camera and the transceiver, and
a first memory operatively connected to the at least one mobile processor, wherein the memory stores a first set of computer-executable instructions that, when executed by the at least one mobile processor, causes the at least one mobile processor to execute a first method that comprises
operating the camera, transmitting the generated video stream via the at least one transceiver, generating a video-associated metadata (VAM) regarding the transmitted video stream, and transmitting the generated video-associated metadata via the at least one transceiver;
a plurality of microphones, each of said plurality of microphones aimed at a specific region within the conference room, each microphone adapted to receive acoustic audio signals, convert the received acoustic audio signals to electrical audio data signals, and transmit the electrical audio data signals as audio data;
at least one room processor transceiver adapted to receive and transmit data and command signals;
at least one room processor communicatively coupled to the at least one room processor transceiver; and
a second memory operatively connected to the at least one room processor, wherein the second memory stores a second set of computer-executable instructions that, when executed by the at least one room processor, causes the at least one room processor to execute a second method that comprises:
receiving the plurality of audio data from each of the plurality of microphones by the at least one room processor transceiver;
generating an audio composite by combining all of the received audio data;
receiving video-associated metadata from each smartphone by the at least one room processor transceiver;
analyzing the received video-associated metadata;
selecting one of the video streams to be a selected video stream based on the analyzed video-associated metadata; and
transmitting the selected video stream and the audio composite to a remote endpoint.

7. The video conference system for a conference room according to claim 6, further comprising generating a plurality of sets of audio metadata respectively for each of the plurality of received audio data.

8. The video conference system for a conference room according to claim 6, wherein the second method further comprises:
analyzing the generated audio metadata from each of the plurality of smartphones to determine ambient noise levels in the conference room;
analyzing the determined ambient noise levels;
selecting an appropriate noise reduction process based on the determined ambient noise level;
applying the selected noise reduction process to the received audio data prior to transmitting the audio data to the remote end;
selecting an appropriate echo cancellation process based on the determined ambient noise level; and applying the selected acoustic echo cancellation process to the received audio data prior to transmitting the audio data to the remote end.

9. The video conference system for a conference room according to claim 7, wherein the step of selecting one of the video streams comprises:
selecting one of the video streams based on one or more of the generated audio metadata in addition to the analyzed video-associated metadata.

10. The video conference system for a conference room according to claim 7, wherein the step of selecting one of the video streams comprises:
selecting one of the video streams based on one or more of the generated audio metadata in place of the analyzed video-associated metadata.

11. The video conference system for a conference room according to claim 6, wherein the step of selecting one of the video streams to be a selected video stream based on the analyzed video-associated metadata includes generating one or more camera control commands based on the received and analyzed video-associated metadata and transmitting the one or more camera control commands to the smartphone that corresponds to the selected video stream.

12. The video conference system for a conference room according to claim 6, wherein the step of analyzing the received video-associated metadata comprises analyzing the received video-associated metadata using one or more machine learning algorithms to identify participants based on their facial features.

13. The video conference system for a conference room according to claim 6, wherein the step of analyzing the received video-associated metadata further comprises analyzing the received video-associated metadata using one or more machine learning algorithms to detect motion.

14. The video conference system according to claim 6, wherein
the second memory stores a third set of computer-executable instructions that, when executed by the at least one processor, causes the at least one processor to execute a third method that comprises:
executing a unified communication software application for hosting a unified communication with the remote endpoint.

15. The video conference system for a conference room according to claim 6, wherein at least one or more of the plurality of microphones comprises:
an array microphone adapted to generate electronically steerable pickup lobes computed by an audio processing software application.

16. The video conference system for a conference room according to claim 6, wherein the step of generating video-associated metadata regarding the transmitted video stream comprises:
generating the video-associated metadata from a hardware sensor other than the camera, and wherein the hardware sensor is located on the smartphone.

17. The video conference system for a conference room according to claim 16, wherein the hardware sensor comprises:
an infra-red LIDAR camera.

18. The video conference system for a conference room according to claim 13, wherein the video-associated metadata includes verification identification information of one or more participants based on facial features from biometric data from said infra-red LIDAR camera.

19. A non-transitory computer-readable medium storing a set of instructions for selecting video and audio in a video conference system for a conference room, the set of instructions comprising:
one or more instructions that, when executed by one or more processors of a device, cause the device to:
operate at least two or more smartphone cameras in the conference room to generate respective video streams;
transmit the generated respective video streams;
generate video-associated metadata (VAM) by the respective smartphones regarding the transmitted video streams;
transmit the generated video-associated metadata to at least one conference room transceiver;
receive the generated video-associated metadata from each of the at least two smartphone cameras by at least one room processor transceiver;
generate audio data by at least two or more microphones located within the conference room, the microphones not communicatively coupled to any of the smartphones;
transmit the generated audio data to the at least one conference room transceiver;
receive the generated audio data from each of the at least two microphones by the at least one room processor transceiver;
generate an audio composite by a room processor communicatively coupled to the at least one room processor transceiver by combining all of the received audio data;
analyze the received video-associated metadata by the room processor; and
select one of the video streams to be a selected video stream based on the analyzed video-associated metadata; and
transmit the selected video stream and the audio composite to a remote endpoint.

20. The non-transitory computer-readable medium of claim 19, wherein the one or more instructions further cause the device to:
generate audio metadata for each of the plurality of received audio data;
analyze the received audio metadata from each of the plurality of smartphones to determine ambient noise levels in the conference room;
select an appropriate noise reduction process based on the determined ambient noise level;
apply the selected noise reduction process to the received audio data prior to transmitting the audio data to the remote endpoint;
select an appropriate echo cancellation process based on the determined ambient noise level; and
apply the selected acoustic echo cancellation process to the received audio data prior to transmitting the audio data to the remote endpoint.

21. The non-transitory computer-readable medium of claim 20, wherein the one or more instructions further cause the device to:
select one of the video streams based on one or more of the generated audio metadata and analyzed video-associated metadata;
generate one or more camera control commands based on the received and analyzed video-associated metadata;
transmit the one or more camera control commands to the smartphone that corresponds to the selected video stream;
analyze the received video-associated metadata to identify participants based on their facial features; and analyze the received video-associated metadata to detect motion.

22. The non-transitory computer-readable medium of claim 21, wherein a plurality of said at least one or more of the plurality of microphones form an array microphone with electronically steerable pickup lobes as computed by an audio processing software application.

23. The non-transitory computer-readable medium of claim 22, wherein the video-associated metadata further comprises verification identification information of one or more participants based on facial features from biometric data from a infra-red LIDAR camera sensor located on the smartphone.

\* \* \* \* \*